(No Model.) 6 Sheets—Sheet 1.

S. H. FISH.
POTATO PLANTING MACHINE.

No. 545,471. Patented Sept. 3, 1895.

Fig. 1.

Witnesses:
George L. Cragg
W. Clyde Jones

Inventor:
Samuel H. Fish.
By Barton & Brown
Attorneys.

(No Model.) 6 Sheets—Sheet 2.
S. H. FISH.
POTATO PLANTING MACHINE.

No. 545,471. Patented Sept. 3, 1895.

Fig. 2.

Witnesses:
George L. Gragg
W. Clyde Jones

Inventor:
Samuel H. Fish
By Barton & Brown
Attys (No Model.) 6 Sheets—Sheet 5.
S. H. FISH.
POTATO PLANTING MACHINE.

No. 545,471. Patented Sept. 3, 1895.

Witnesses:
George L. Cragg
W. Clyde Jones

Inventor:
Samuel H. Fish
By Barton & Brown Attys

(No Model.) 6 Sheets—Sheet 6.

S. H. FISH.
POTATO PLANTING MACHINE.

No. 545,471. Patented Sept. 3, 1895.

Witnesses:
George L. Cragg.
W. Clyde Jones.

Inventor:
Samuel H. Fish.
By Barton & Brown Attys

UNITED STATES PATENT OFFICE.

SAMUEL H. FISH, OF HINSDALE, ASSIGNOR OF ONE-HALF TO HENRY C. MIDDAUGH, OF CLARENDON HILLS, ILLINOIS.

POTATO-PLANTING MACHINE.

SPECIFICATION forming part of Letters Patent No. 545,471, dated September 3, 1895.

Application filed June 18, 1894. Serial No. 497,309. (No model.)

*To all whom it may concern:*

Be it known that I, SAMUEL H. FISH, a citizen of the United States, residing at Hinsdale, in the county of Du Page and State of Illinois, have invented a certain new and useful Improvement in Potato-Planting Machines, (Case No. 12,) of which the following is a full, clear, concise, and exact description, reference being had to the accompanying drawings, forming a part of this specification.

My invention relates to a potato-planting machine, and more particularly to certain improvements in a machine described in Letters Patent No. 505,877, granted to me October 3, 1893. In said machine I provide a hopper, into which the potatoes to be planted are placed and from which the potatoes are passed, a few at a time, into a separation-chamber. A reciprocating shover in this chamber carries the potatoes into a dipper, which at intervals rises and empties its contents into a pocket, from which the potatoes are extracted by forks mounted upon a rotating disk, the forks being withdrawn from the potatoes at the proper time in the rotation of the disk to permit them to fall into the drills prepared by a shovel carried upon the machine. I have found this construction objectionable, since the dipper must be raised and lowered too rapidly to work with entire satisfaction.

My invention herein consists in a machine comprising a separation-chamber, in which are located separating-fingers, which are adapted to separate a number of potatoes from the potatoes in the separation-chamber and retain the same in this separated condition until the forks have been inserted in the potatoes, after which time the fingers release the potatoes and permit the forks to carry the same to the proper position and drop them. I preferably arrange the separating-fingers in two opposed series adapted to alternately approach and recede from one another, the fingers during their approach singling out the potatoes and holding them between their opposed faces, which thus form a temporary pocket until the forks have pierced the potatoes, after which the fingers recede to permit the removal of the potatoes by the forks. In order to accommodate the temporary pocket thus formed to potatoes of varying sizes, one series of the fingers is preferably yieldingly mounted, so that the capacity of the pocket may be varied to suit the size or number of the potatoes caught between the separating-fingers.

My invention consists, further, in an improved means for removing the potatoes from the temporary pocket.

My invention consists, further, in such other improvements as will hereinafter be set forth.

I will describe my invention in connection with the accompanying drawings, in which I have illustrated the preferred embodiment of my invention.

Fig. 3 is a similar view as seen from the opposite side of the machine. Fig. 3$^a$ is a detached view of the scooping-plate for preventing the potatoes from becoming clogged in the separation-chamber, the scooping-plate being shown at the rightward end of its travel. Fig. 3$^b$ is a similar view showing the position assumed by the scooping-plate when potatoes have become lodged behind it.

Like letters refer to like parts in the several figures.

A sprocket-wheel $a$ is carried upon the main axle of the machine, which by means of a sprocket-chain imparts motion to the sprocket-wheel $a'$. In order to provide for different speeds, sprocket-wheels of different sizes may be provided.

Rotating with the sprocket-wheel $a'$ is a disk $a^2$, carrying a crank-pin $a^3$. Journaled to said crank-pin by one end is a link $a^4$, the other end of which is journaled at $a^5$ to a bar $b$, which is reciprocated as the disk $a^2$ revolves. A link $b'$ is journaled by one end to the reciprocating bar $b$ and at the other end to a lever $b^2$, which is fulcrumed at $b^3$ in the upright support $b^4$. A link $b^5$ is journaled to the free end of lever $b^2$, and as the bar $b$ reciprocates link $b^5$ is caused to move back and forth horizontally. The end of link $b^5$ is connected through intermediate mechanism (hereinafter to be described) with the series of separating-fingers $c$, so that as the lever $b^5$ moves back and forth the separating-fingers $c$ are reciprocated. Said fingers $c$ move back and forth in slots provided in the bottom of the separation-chamber.

To the forward end of the reciprocating bar $b$ is journaled the link $d$, whose other end is journaled to the lever $d'$, fulcrumed at $d^2$. To the lower end of lever $d'$ is journaled one end of link $d^3$, whose other end is journaled to the reciprocating bar $d^4$. Upon the end of bar $d^4$ is carried the second series of separating-fingers $c'$, which extend through the longitudinal slots provided in the bottom of the separation-chamber. As the bar $b$ is reciprocated the bar $d^4$, and consequently the separating-fingers $c'$, are reciprocated. The lever connections are such that the separating-fingers $c$ and $c'$ are thus caused to alternately approach and recede, the fingers in their approached condition occupying positions as illustrated in Fig. 6.

Figures 10, 11:
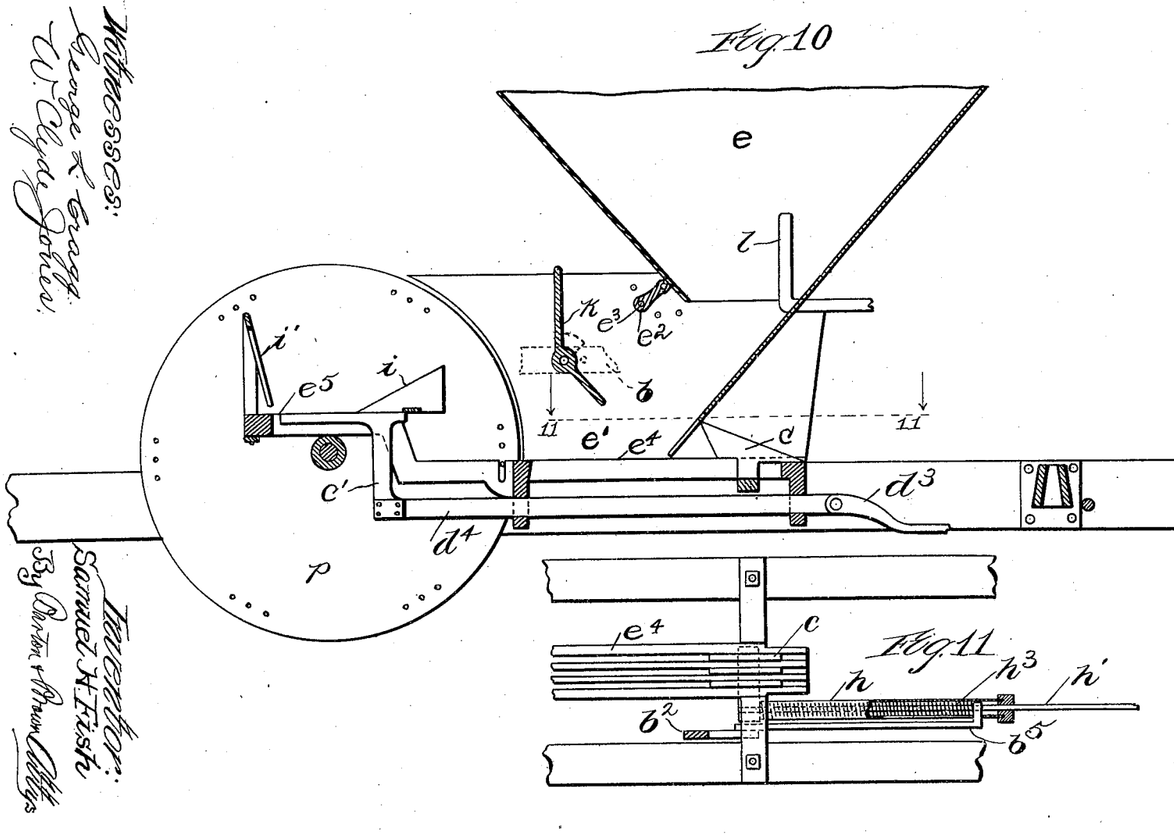
Fig. 10 is a sectional view showing the relative location of the hopper, the separation-chamber, and the fork-carrying disk.
Fig. 11 is a plan view of a portion of Fig. 10 as seen along line 11 11.

Referring now to Fig. 10, the potatoes to be planted are placed in the hopper $e$ and fed therefrom into the separation-chamber $e'$, the entrance into which may be regulated by the gate $e^2$, which, by means of pins $e^3$, may occupy one of several positions to enlarge or contract the opening. The potatoes entering the separation-chamber fall upon the bars $e^4$, forming the bottom of said chamber, and as the separating-fingers $c$ and $c'$ approach all but a few of the potatoes are excluded from between them. As potatoes are of varying sizes and as the number of potatoes caught between the separating-fingers may vary from time to time, it is evident that the temporary pocket thus formed should be adjustable in size, and to accomplish this I yieldingly mount the separating-fingers $c$.

Figure 1:
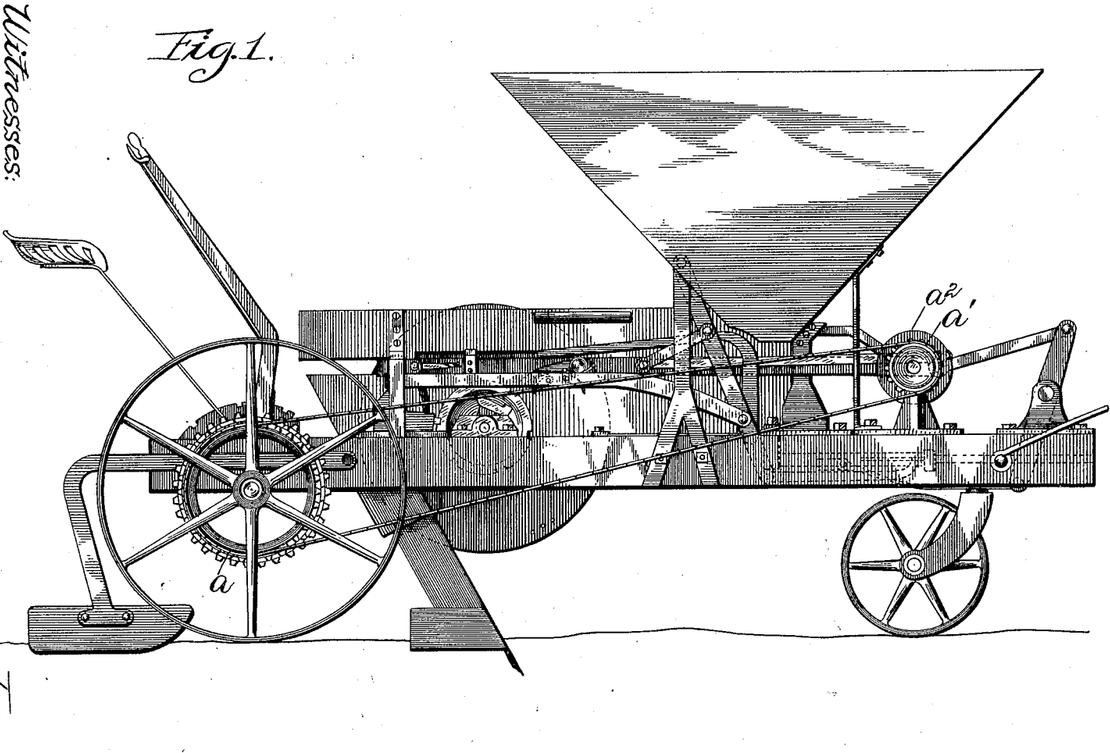
Figure 1 is a sectional view of the machine.
Figure 2:
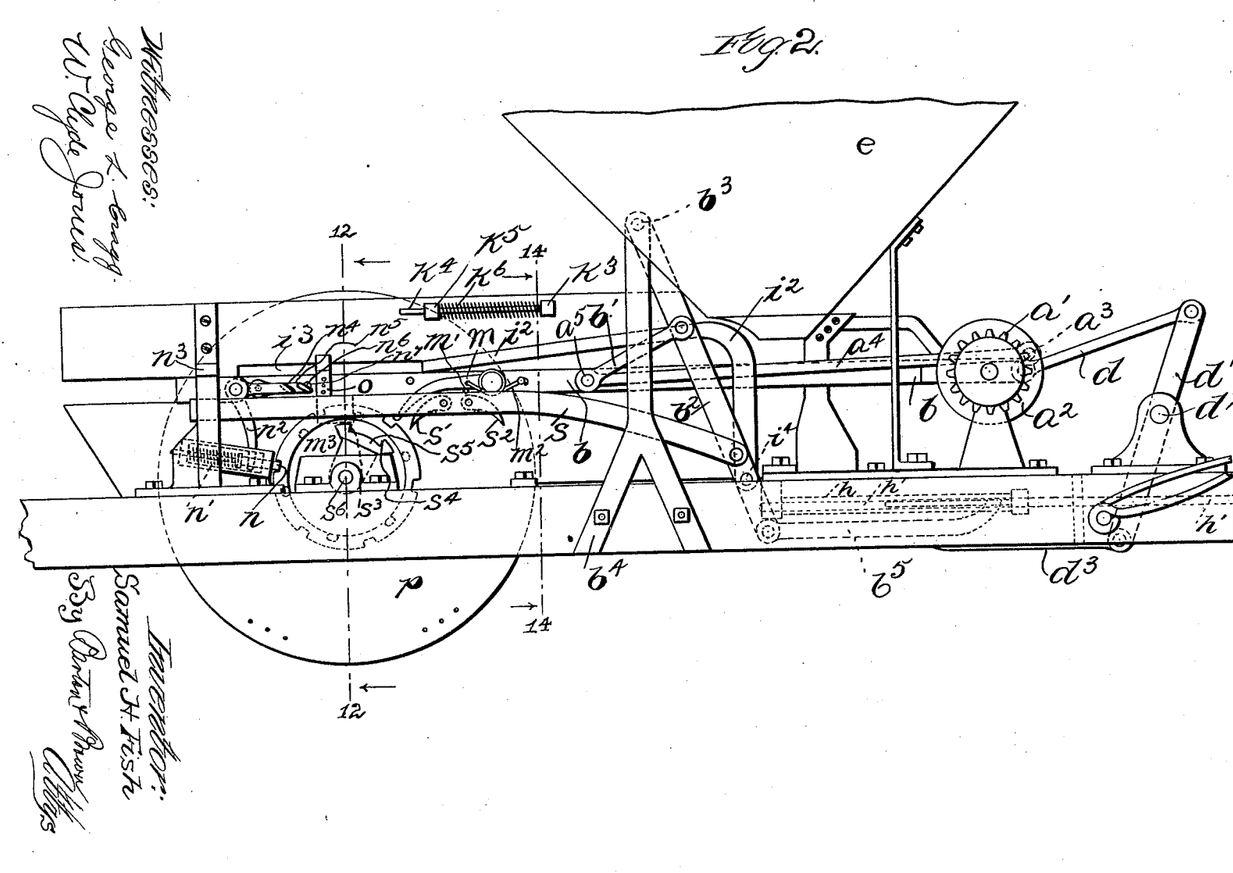
Fig. 2 is a sectional view showing the operating mechanism as seen from one side of the machine.
Figures 4, 5, 6, 7, 8, 9:
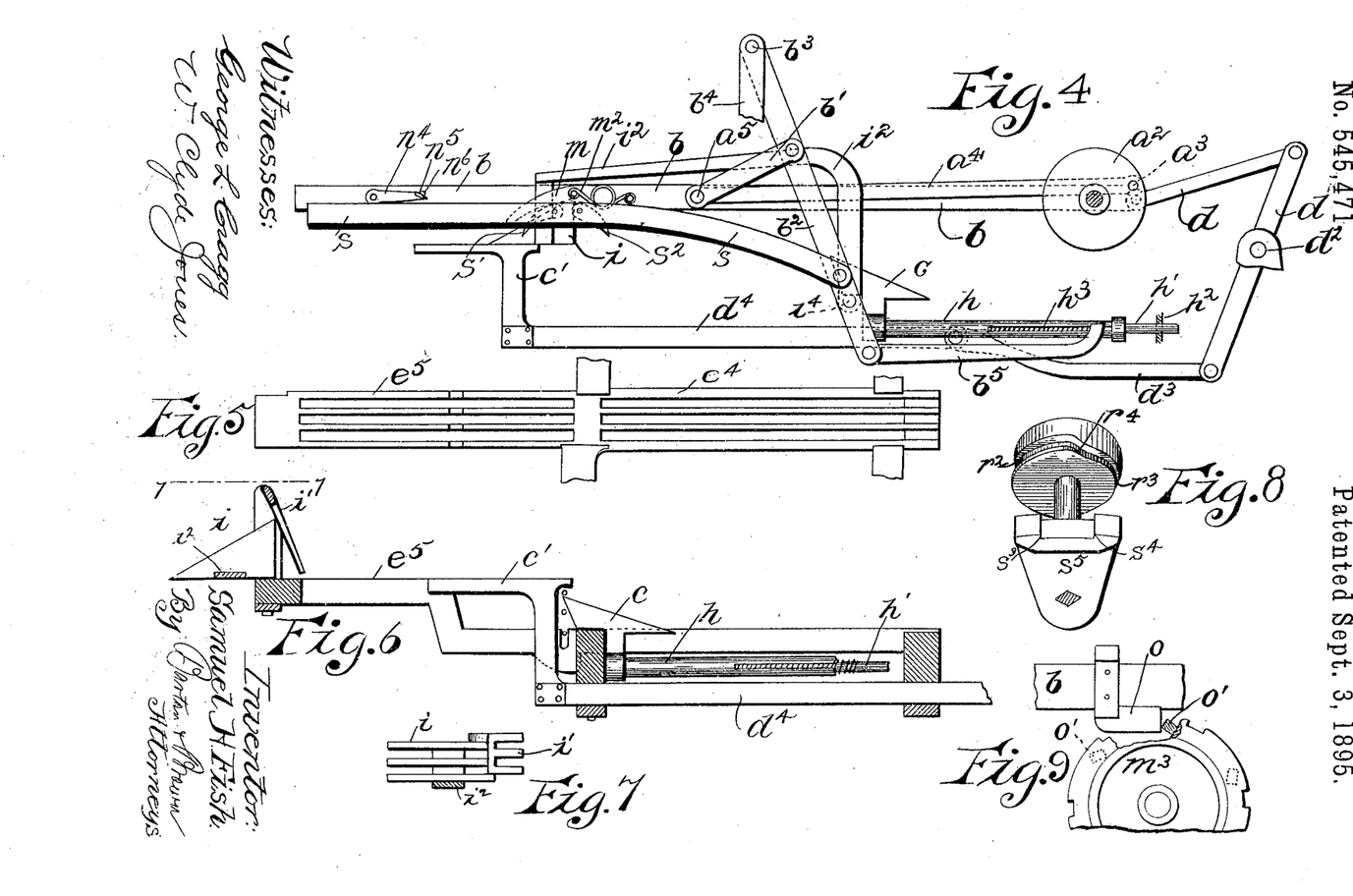
Fig. 4 is a detached view of the mechanism for operating the separating-fingers.
Fig. 5 is a plan view of the bottom of the separation-chamber.
Fig. 6 is a view showing the separating-fingers approached to form the temporary pocket.
Fig. 7 is a plan view of that portion of Fig. 6 seen along line 7 7.
Fig. 8 is an isometric view of the cam that separates the forks and its actuating rocker-block.
Fig. 9 is a detail view of the device for preventing the recoil of the disk carrying the forks.

Referring to Figs. 2, 4, and 11, the fingers $c$ are mounted upon the end of a rod $h'$, which moves back and forth in the bearing $h^2$. The end of the link $b^5$ encircles loosely the rod $h'$, and between the encircling end thereof and the leftward end of the rod $h'$ is located a helical spring $h^3$, the tension of which is such that when the fingers $c$ meet no unusual resistance in their advance the spring will not be compressed, the rod $h'$ being moved bodily forward by the link $b^5$. Should the potatoes singled out by the fingers in their approach be of unusual size, the temporary pocket accommodates itself to the requirement of enlarged capacity by the yielding of the fingers $c$ through the compression of the spring $h^3$. A pipe $h$ may inclose the spring $h^3$ to protect it from dirt, a slot being provided therein for the travel of the end of link $b^5$. The opposed faces of the separating-fingers are made curved or inclined, so as to retain the potatoes between them. The rear faces of the fingers $c$ are made sloping, so that as the said fingers recede they will pass beneath the potatoes in the separation-chamber, said sloping surfaces coacting with the sloping wall of the hopper $e$ to transport the potatoes to the front of said fingers as they are withdrawn. The fingers $c'$ are provided with plane upper surfaces, which are flush with the raised portion $e^5$ of the separation-chamber. As the potatoes are thrust from between the separating-fingers on their approach some of them may rest upon the upper faces of the fingers $c'$, and, again, such potatoes as may rest upon those pierced by the fork in falling may fall to the rear of the fingers $c'$. To immediately transport such potatoes to a position in front of fingers $c'$, I provide the shover $i$. As the fingers $c'$ recede the advancing shover $i$ pushes the potatoes to a position in front of said fingers $c'$. The shover $i$ comprises plates placed parallel, as shown in Figs. 6 and 7, the rear surfaces being sloping, so that as the shover makes its rearward stroke the plates, passing between the teeth of the plate $i'$, cause the potatoes that may rest to the rear of said shover to assume position in front thereof. The shover $i$ is actuated by a lever $i^2$, which is secured to the lower edges of the plates of the shover, as shown in Figs. 6 and 7, passes upward, then bends at right angles and passes through the slot $i^3$, Fig. 2, then bends forward, and is journaled at its forward end to lever $b^2$ at $i^4$. As lever $b^2$ oscillates, the shover is thus reciprocated by means of said lever $i^2$.

Figures 3, 3A, 3B:
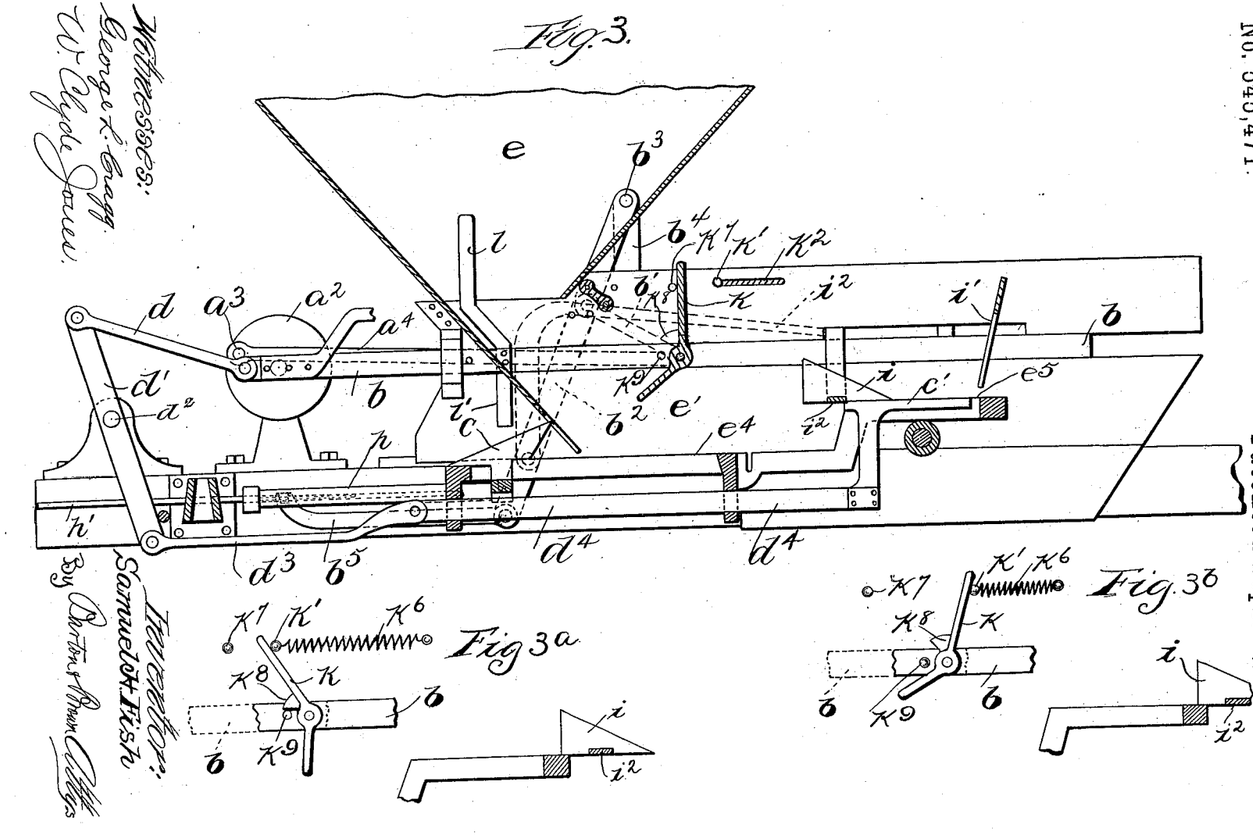

In order to prevent the clogging of the potatoes in the separation-chamber, I provide a scooper comprising a swinging plate $k$, pivoted upon the reciprocating bar $b$. When bar $b$, Fig. 3, is at the left end of its travel, the upper end of said plate rests against the stationary stop $k^7$, and as the bar $b$ moves to the right the upper end of said plate comes in contact with the pin $k'$ and moves the said scooping-plate into the position shown in Fig. 3$^a$, with the lug $k^8$, carried on the arm, resting against the pin $k^9$, carried on the bar $b$. Should potatoes rest between the shover $i$ and the scooper end of plate $k$ and offer resistance to the advance of the scooper-plate, the same will give, as shown in Fig. $3^b$, by rotation about its pivotal axis, the upper end of the scooper-plate meanwhile compressing the coiled spring $k^6$, which, as shown in Fig. 2, is located between the block $k^3$, to which pin $k'$ is attached, and the stationary block $k^5$, the spring being coiled about the rod $k^4$, which is movable with block $k^3$ and which travels in a bearing provided in block $k^5$. When bar $b$, Figs. 3, $3^a$, and $3^b$, moves to the left, the scooper end of plate $k$ carries forward the potatoes in front of it, the lug $k^8$ resting against pin $k^9$, and when the upper end of said plate strikes the stationary stop $k^7$ the scooping-plate is rotated, the scooping end being thus suddenly thrust forward to push the potatoes back into the hopper. The potatoes are thus prevented from becoming clogged in the separation-chamber.

As shown in Figs. 3 and 10, agitating-rods $l$, secured to the reciprocating bar $b$, extend into the hopper to agitate the potatoes and cause them to fall into the separation-chamber, an agitating-rod $l'$ being also provided in the separation-chamber. Upon the reciprocating bar $b$ is pivoted a detent $m$, yieldingly held against the stop $m'$ by a spring $m^2$. Upon the stroke of said bar $b$ the detent $m$ engages the notches in the ratchet-wheel $m^3$ to impart to the same a fractional rotation. To maintain said wheel $m^3$ stationary, except when rotated by detent $m$, a pin $n$ normally rests in one of the notches, but is withdrawn just as detent $m$ engages said wheel to rotate it. The said pin $n$ is yieldingly held in the notch by a spring $n'$ and is encircled by the end of a bell-crank $n^2$, pivoted to a lug carried upon the upright support $n^3$. The second arm of the bell-crank $n^2$ carries an obliquely-situated lug $n^4$. Upon the reciprocating bar $b$ is pivoted an arm $n^5$, provided with an obliquely-situated lug $n^6$, the arm being yieldingly held against a stop $n^7$, located above its end. When the bar $b$ moves to the left, the lug $n^6$ engages the lug $n^4$ to withdraw pin $n$ from the notch. Upon the return of the bar $b$ the lug $n^6$ passes beneath the lug $n^4$, due to the engagements of the oblique surfaces and the yielding mounting of arm $n^5$. Should the detent $m$ suddenly strike the ratchet-wheel, due, for instance, to a sudden jerk by the team, the ratchet-wheel will be given an impetus that will tend to make it rotate at a rate faster than the detent can follow it, and in order to prevent such independent rotation a stop $o$, Fig. 9, is provided, secured to the bar $b$, against which the lugs $o'$ will strike to limit the independent movement of the ratchet-wheel.

Figure 12:
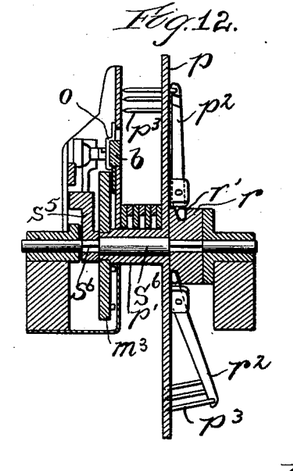
Fig. 12 is a sectional view on line 12 12, Fig. 2.
Figure 13:
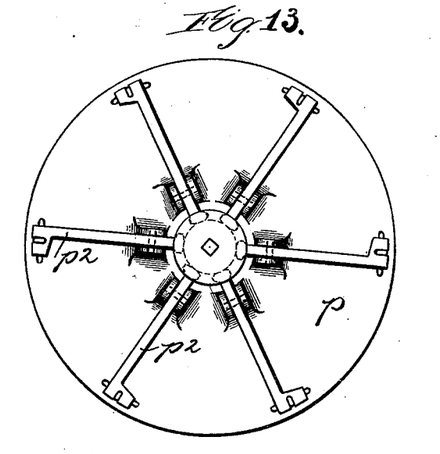
Fig. 13 is an elevation of the fork-carrying disk.

As shown more clearly in Figs. 12 and 13, a disk $p$ is mounted upon a sleeve $p'$, so as to rotate with ratchet-wheel $m^3$. Upon the face of said disk the fork-arms $p^2 p^2$ are mounted, the inner ends thereof being adapted to travel in a groove $r'$ in the cam $r$, while the outer ends carry forks $p^3 p^3$, which in one position of the arm extend through openings provided in the disks.

Upon a bar $s$, Fig. 2, one end of which is journaled to the oscillating lever $b^2$, while the other end travels in a bearing in the upright support $n^3$, are pivoted two detents $s' s^2$, which engage the projections $s^3 s^4$ of the rocking block $s^5$, mounted upon the rocking shaft $s^6$, at each stroke of the bar $s$, the detent $s'$ moving the block $s^5$ to the left and the detent $s^2$ moving it back to the right. Upon the shaft $s^6$ is mounted the cam $r$, so that as the block $s^5$ is rocked the cam $r$ is rocked likewise. The groove $r'$ in the cam comprises two parallel portions $r^2 r^3$, Figs. 8 and 15, connected by short angular portions $r^4$. The cam $r$ is stationary as the disk $p$ is rotated and the fork-arms whose ends rest in the portion $r^3$ of the groove stand with the forks withdrawn from the disk, while those whose ends rest in the portion $r^2$ of the groove stand with the forks extending through the disk. The disk $p$ having come to rest, the cam $r$ is slightly rotated by the block $s^5$ and the two arms whose ends are engaged by the angular portions $r^4$ of the groove are actuated, the forks of one being withdrawn from the disk and those of the other inserted therethrough. The forks inserted are in position to pierce the potatoes in the temporary pocket between the separating-fingers, while the forks withdrawn occupy a diametral position, and thus drop the potatoes pierced thereby into a hollow shoe, which conducts them to the drills.

I will now describe briefly the operation of the machine. The potatoes are fed from the hopper into the separation-chamber by the agitators. The separating-fingers, advancing, single out one or more potatoes, the fingers $c$ yielding to acommodate the temporary pocket to the size and number of the potatoes. Under some conditions the separating-fingers upon approaching will single out but enough potatoes for a single hill, all of which will be pierced by the forks and removed from the pocket, while under other conditions more than a sufficient number of potatoes for a single hill may be grasped between the separating-fingers, in which case but the potatoes occupying positions next the fingers $c'$ will be pierced by the forks. The fingers $c'$ always occupy the same position when the piercing-forks are operated, the forks passing into the temporary pocket a short distance from said fingers. When, therefore, small potatoes happen to occupy positions next fingers $c'$, they may be pierced toward their middle portions, while larger potatoes will be pierced nearer the ends, the planting of intermingled large and small potatoes being thus effected. During the approaching movement of the separating-fingers the bar $b$, Fig. 2, has been moving to the left and the detent $m$ has engaged and rotated the ratchet-wheel $m^3$ one notch, thus bringing one of the fork-arms, with its piercing-forks, opposite the temporary pocket between the separating-fingers. Shortly before the disk $p$ completes its fractional rotation to bring the piercing-forks opposite the temporary pocket the detent $s'$ impinges against the projection $s^3$ on rocking block $s^5$, thus moving the cam $r$ into proper position to engage the fork-carrying arm. The fractional rotation of the disk $p$ having been completed and the piercing-forks having been brought to a position opposite the temporary pocket, the bar $b$ begins its return stroke and the detent $s^2$ impinges against the projection $s^4$ of block $s^5$ to rotate said block to the right to cause the angular portion $r^4$ of the groove in cam $r$ to engage the end of the fork-carrying arm to cause the forks to pierce the potatoes in the temporary pocket.

Figures 14, 15, 16:
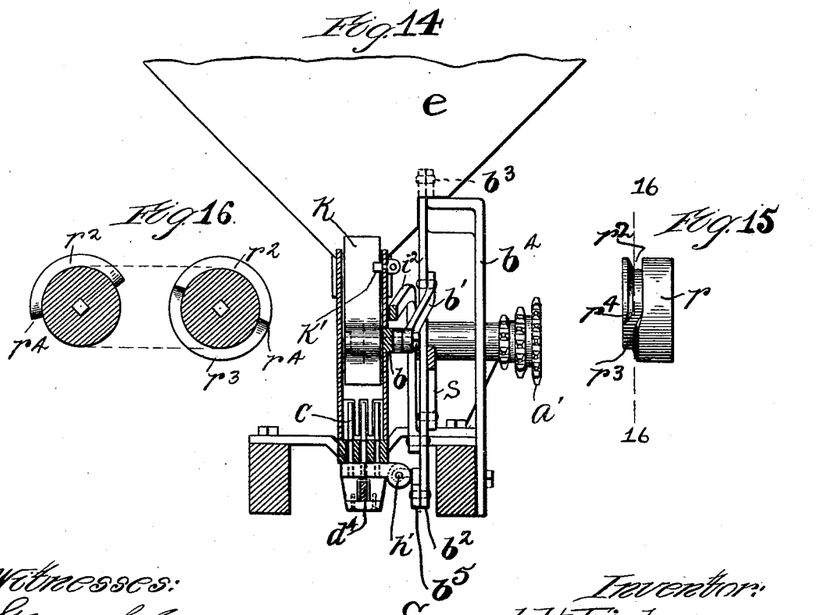
Fig. 14 is a sectional view on line 14 14, Fig.
Fig. 15 is a detail view of the cam that operates the forks.
Fig. 16 shows sectional views of the cam on line 16 16, Fig. 15.

Referring to Figs. 12 and 15, it will be observed that Fig. 15 is an elevation of the cam as it appears in Fig. 12. When, therefore, the rocking block $s^5$ is rocked to the right, (i. e., toward the observer, looking at Fig. 12,) the curved portion $r^4$ of the cam engages the end of the arm the forks of which are opposite the pocket, causing the end thereof engaging with the cam to move suddenly away from disk $p$, thus causing the end carrying the forks to approach the disk and the forks carried thereby to pierce the potatoes in the pocket. The cam remains in this position until toward the completion of the forward stroke of bar $b$ the detent $s'$ moves the cam backward to be in position to insert the forks of the next arm. The disk $p$ is then rotated step by step at each forward stroke of bar $b$ until the fork-arm occupies the position diametrically opposite to that which it occupied when opposite the temporary pocket, when by the rotation of the cam $r$ the end of the arm is engaged by the angular portion $r^4$, diametral to that shown in Fig. 15, and moved toward the disk $p$, thus withdrawing the forks upon the opposite end from the potatoes and permitting them to fall into the drills.

Instead of having the forks drop the potatoes after traveling one hundred and eighty degrees they may be caused to drop them earlier or later by changing the location of the angular portion of the groove that effects the dropping operation.

In fact, my invention is susceptible of numerous modifications and changes in matter of detail, and I do not, therefore, desire to limit myself to precise constructions; but, Having described my invention, what I claim as new, and desire to secure by Letters Patent, is—

1. In a potato planter, the combination with two series of separating fingers adapted to gather between their opposed faces a number of potatoes, of piercing forks adapted to be inserted into one or more of the potatoes thus gathered to remove the same from between the separating fingers and drop the same in the drills, substantially as described.

2. In a potato planter, the combination with two series of separating fingers, of means for moving the same toward one another to form between the opposed faces a temporary pocket to single out the potatoes, and piercing forks adapted to be inserted into one or more potatoes thus singled out to remove the same from the temporary pocket, substantially as described, 3. In a potato planter, the combination with the automatically operated forks for carrying the potatoes one hill at a time, of a yielding pocket into which the potatoes are gathered to be in position to be taken up by the forks.

4. In a potato planter, the combination with a series of forks mounted upon a cylinder moved step by step, of cam mechanism for operating the forks to take up and drop the potatoes one hill at a time, and a pocket having a yielding wall or side to prevent crushing the potatoes when gathered therein, said pocket being in the path of the forks, whereby the potatoes are brought into position to be picked up by the forks, substantially as described.

5. The combination with a reciprocating bar or carriage, of a detent carried thereon, a ratchet wheel adapted to be engaged and rotated thereby, and carrying a projection or stop, and a limiting stop mounted upon said bar in a stationary position and adapted to be engaged by the stop upon the ratchet wheel only when said ratchet wheel tends to travel faster than the detent, substantially as described.

6. In a potato planting machine, the combination with the reciprocating separating fingers provided with inclined surfaces adapted upon the approach of the fingers to form a temporary pocket, of piercing forks adapted to pierce potatoes in said pocket, and means for separating said fingers to permit the removal of said pierced potatoes by said piercing forks, substantially as described.

7. In a potato planting machine, the combination with the reciprocating bar, of the reciprocating separating fingers connected by linkage with said bar, whereby they are caused to approach and recede from one another, the disk carrying the piercing forks adapted to be rotated step-by-step as said bar is reciprocated, and the cam actuated by the reciprocation of said bar adapted to cause the piercing forks to enter the temporary pocket formed by the separating fingers, and to withdraw the same from the potatoes at another point in the travel of the disk, substantially as described.

8. In a potato planting machine, the combination with the separating fingers adapted to form a temporary pocket, of a yielding mounting for one of the series of fingers; whereby the capacity of said pocket may be varied, substantially as described.

9. In a potato planting machine, the reciprocating separating fingers adapted on their approach to form a temporary pocket, one series of said fingers being yieldingly mounted, whereby the capacity of said pocket may be varied, substantially as described.

10. In a potato planting machine, the combination with the separating fingers $c$ mounted upon the reciprocating rod $h'$, of the link $b^5$, the end thereof encircling said rod $h'$, and the spring $h^3$ located between the end of link $b^5$ and rod $h'$, substantially as described.

11. In a potato planting machine, the combination with the arms carrying the piercing forks, of the cam $r$ provided with the groove comprising the parallel portions $r^2$ $r^3$ and the angular portions $r^4$ $r^4$, in which the ends of said arms are adapted to travel, the rocking block $s^5$ movable with said cam, and the reciprocating detents $s'$ $s^2$ adapted to rock said block $s^5$ to impart a rocking movement to said cam, substantially as described.

12. In a potato planter, the combination with the separating fingers adapted to be approached to form a temporary pocket to single out a number of potatoes, of piercing forks adapted to be inserted into said pocket to remove one or more potatoes therefrom, and cam mechanism for inserting said forks into said pocket before said separating fingers have receded to open said pocket, substantially as described.

13. In a potato planting machine, the combination with the reciprocating bar $b$, of the separating fingers $c$, $c'$ adapted to be approached thereby to form a temporary pocket, the detents $s'$ $s^2$ adapted to be reciprocated by said bar $b$, the rocking block $s^5$ adapted to be engaged thereby, the cam $r$ for actuating said piercing forks, the movement of said detents $s'$ $s^2$ relatively to said bar $b$ being such that said piercing forks are caused to enter the temporary pocket before the same is opened by the recession of the separating fingers, substantially as described.

14. In a potato planting machine, the combination with the ratchet wheel $m^3$ adapted to rotate the disk carrying the piercing forks, of the reciprocating detent $m$, adapted to rotate said ratchet wheel step-by-step, and the stop $o$ adapted to engage with lugs $o'$ to limit the movement of the ratchet wheel independently of said detent, substantially as described.

15. In a potato planting machine, the combination with the reciprocating bar $b$ of the separating fingers $c'$ mounted upon the reciprocating bar $d^4$, the pivoted lever $d'$, and the links $d$ and $d^3$ connecting the ends of said lever with said reciprocating bars $b$ and $b^4$, substantially as described.

16. In a potato planting machine, the combination with the reciprocating bar $b$, of the oscillating lever $b^2$ connected therewith by link $b'$, the link $b^5$, the separating fingers $c$ and a yielding connection between said fingers $c$ and the end of said link $b^5$, substantially as described.

17. In a potato planting machine, the combination with the swinging scooping plate $k$ mounted upon the reciprocating bar $b$, of the stationary stop $k^7$ adapted to impart to the scooping end of said plate a thrusting movement, and the resiliently mounted pin $k'$ adapted to yieldingly limit the swinging of said plate, substantially as described.

In witness whereof I hereunto subscribe my name this 15th day of January, A. D. 1894.

SAMUEL H. FISH.

Witnesses:
W. CLYDE JONES,
GEORGE L. CRAGG.